No. 881,647. PATENTED MAR. 10, 1908.
E. F. W. ALEXANDERSON.
SELF EXCITED ALTERNATOR.
APPLICATION FILED FEB. 19, 1906.
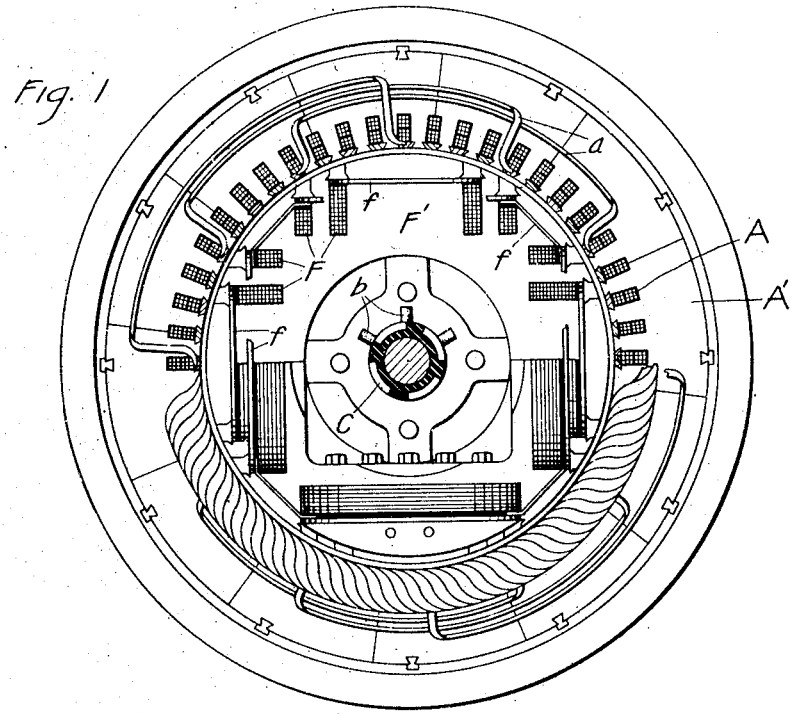
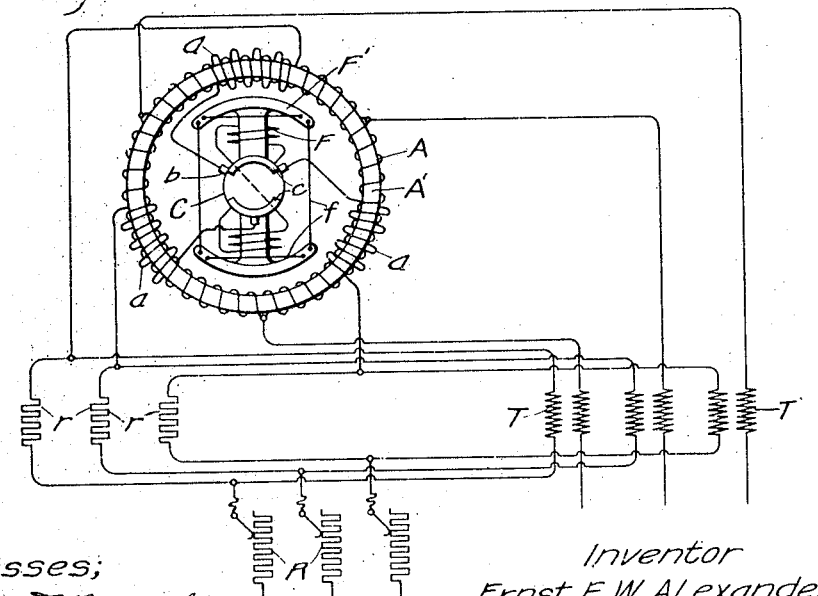
Witnesses:
Inventor
Ernst F. W. Alexanderson
By
Att'y.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

SELF-EXCITED ALTERNATOR.

No. 881,647.        Specification of Letters Patent.        Patented March 10, 1908.

Application filed February 19, 1906. Serial No. 301,727.

*To all whom it may concern:*

Be it known that I, ERNST F. W. ALEXANDERSON, a subject of the King of Sweden, residing at Schenectady, in the county of Schenectady and State of New York, have invented certain new and useful Improvements in Self-Excited Alternators, of which the following is a specification.

My invention relates to self-exciting alternators, and is particularly applicable to the type of machine described in Patent No. 789,476, issued to me May 9, 1905. In that patent I disclosed a self-exciting alternating-current machine having a field winding provided with a rectifying commutator and means for supplying to the field winding through the commutator superposed voltages, derived from the armature in shunt and in series, respectively. A convenient method of obtaining the shunt excitation is through an auxiliary winding carried by the armature, and by means of this arrangement the expense of shunt transformers is saved. One suitable arrangement for the auxiliary winding is that disclosed in my former Patent No. 849,713, issued April 9, 1907, in which the auxiliary winding is composed of conducting strips which are inserted in the armature slots between the armature coils and the retaining wedges. This arrangement of the auxiliary winding at the top of the slot gives the winding the minimum reactance, thereby offering the best conditions for proper commutation.

My present invention comprises an additional feature for further reducing the reactance of the auxiliary winding, and consists in supplying a short-circuited winding to the field magnet in inductive relation to the auxiliary winding. This short-circuited winding acts as a low-resistance secondary for the auxiliary winding, materially lowering its self-induction.

My invention is particularly advantageous in connection with machines having laminated field magnets, since in such machines the field magnet itself cannot act as a short-circuited secondary, and consequently the reactance of the auxiliary winding is high.

My invention is also particularly adapted for use in machines of the type having cylindrical field magnets such as are ordinarily employed in turbine-driven machines at the present time. Field magnets of this type offer a path of low reluctance for the flux from a coil in the armature, which tends to increase the reluctance of the auxiliary winding. This tendency is overcome by means of my invention.

In the accompanying drawings, Figure 1 shows an end-view, partly in cross-section, of a self-exciting alternator arranged in accordance with my invention; and Fig. 2 is a diagram of the circuit connections.

In the drawings, A' represents the armature core, which is built up of laminations in the usual manner.

A represents the main armature coils which are carried in slots and held in place by suitable retaining wedges.

$a$ represents the auxiliary winding, which is inserted in the armature slots between the armature winding and the retaining means, as described in my former application above referred to. These strips are placed in as many slots as necessary to give the desired voltage, and the strips are connected to give a winding any desired character.

F' represents the field magnet, which is shown as of the cylindrical type commonly employed in turbine-driven alternators.

F represents the field coils carried in slots in the field magnet. The field magnet is also provided with a short-circuited distributed winding $f$ in inductive relation to the auxiliary winding so as to act as a short-circuited secondary to reduce the reactance of the auxiliary winding. As shown in the drawing this short-circuited winding may be formed conveniently by short-circuiting a few of the turns of the field coils and winding some of these short-circuited turns around the portions of the field magnet between the poles. C represents a rectifying commutator, to the segments of which the terminals of the field winding F are connected.

$b$ represents brushes bearing on the commutator, and connected to the auxiliary winding. Through these brushes and through the rectifying commutator the exciting current is supplied from the auxiliary winding to the field.

In Fig. 2 the connections of the machine are shown diagrammatically. These connections are fully explained in my former patents above referred to, but will be briefly described here in order to make my present invention clear. For the sake of simplicity, both the main armature winding A and the auxiliary winding $a$ are shown as gram-ring windings. F represents the field winding, the terminals of which are connected to the segments c of the rectifying commutator C. This commutator is of the type disclosed in my former patents, comprising a polyphase arrangement of brushes b b and segments of a length substantially equal to the distance between brushes. As fully explained in my former patents, if a polyphase voltage is impressed upon the brushes a rectified current is delivered to the field winding. The arrangement of brushes shown is adapted for a threephase excitation, and the auxiliary winding a is consequently arranged and connected in three-phase. The resistances r are placed in series with the several phases of the auxiliary winding, and across the terminals of these resistances are connected the secondaries of transformers, T T, the primaries of which are in series with the main armature winding. These transformers serve to impress across the terminals of the resistances r in series with the auxiliary winding voltages corresponding in amount and phase to the armature current. These transformers are so connected to the resistances that the phase of the voltage impressed across the terminals of the resistances r is ninety degrees from the phase of the voltage of the auxiliary winding when the load on the machine is non-inductive. This arrangement, as fully explained in my former patents, gives proper compounding for both inductive and non-inductive loads. R represents a field rheostat by means of which the voltage of the machine may be regulated in the usual manner.

It will be seen that as the field magnet and its rectifying commutator revolve, the circuits of the several phases of the exciting winding are successively broken. In order to avoid sparking due to this breaking of its circuit, the auxiliary winding should have as low a reactance as possible, and since the short-circuited winding on the field above described assists in producing a low reactance, it is of assistance in producing perfect commutation.

What I claim as new and desire to secure by Letters Patent of the United States, is,

1. In a self-exciting alternator, a main armature winding, an auxiliary winding, a field winding provided with a rectifying commutator, brushes bearing on said commutator and connected to said auxiliary winding, and a short-circuited winding carried by the field magnet in inductive relation to said auxiliary winding.

2. In a self-exciting alternator, a slotted armature core, a main armature winding in said slots, an auxiliary winding in the top of said slots above the armature winding, a field magnet, a field winding carried thereby provided with a rectifying commutator, brushes bearing on said commutator and connected to said auxiliary winding, and a short-circuited winding carried by the field magnet in inductive relation to said auxiliary winding.

3. In a self-exciting alternator, a main armature winding, an auxiliary winding, a field magnet, a field winding carried thereby provided with a rectifying commutator, and brushes bearing on said commutator and connected to said auxiliary winding, said field winding having a few turns short-circuited on themselves.

4. In a self-exciting alternator, a main armature winding, an auxiliary winding, a field magnet, a field winding carried thereby provided with a rectifying commutator, brushes bearing on said commutator and connected to said auxiliary winding, and short-circuited conductors surrounding each pole and the spaces between poles.

5. In a self-exciting alternator, a main armature winding, an auxiliary winding, a cylindrical field magnet, a field winding carried in slots therein and provided with a rectifying commutator, brushes bearing on said commutator and connected to said auxiliary winding, and short-circuited conductors surrounding each field pole and the spaces between poles.

6. In a self-exciting alternator, a main armature winding, an auxiliary winding, a cylindrical field magnet, a field winding carried in slots therein and provided with a rectifying commutator, brushes bearing on said commutator and connected to said auxiliary winding, said field winding having a few turns short-circuited on themselves and a portion of said turns being arranged to surround the spaces between poles.

7. In a self-exciting alternator, a main armature winding, an auxiliary winding, a cylindrical field magnet, a field winding carried in slots therein and provided with a rectifying commutator, brushes bearing on said commutator and connected to said auxiliary winding, and short-circuited conductors in the top of the field magnet slots surrounding each field pole and the spaces between poles.

In witness whereof, I have hereunto set my hand this 17th day of February, 1906.

ERNST F. W. ALEXANDERSON.

Witnesses:
BENJAMIN B. HULL,
HELEN ORFORD.